United States Patent [19]
Nelsen

[11] Patent Number: 5,378,034
[45] Date of Patent: Jan. 3, 1995

[54] FLEXIBLE CARGO CONATINER FOR TRUCK BEDS

[76] Inventor: Robert J. Nelsen, 529 N.W. 3rd St., Chisholm, Minn. 55719

[21] Appl. No.: 10,799

[22] Filed: Jan. 29, 1993

[51] Int. Cl.⁵ .............................................. B60R 13/01
[52] U.S. Cl. .................... 296/39.2; 296/100; 220/403
[58] Field of Search ............... 296/100, 39.2, 37.6; 220/403, 401, 470; 105/423

[56] References Cited

U.S. PATENT DOCUMENTS

| | | | |
|---|---|---|---|
| 2,803,491 | 8/1957 | Brown | 296/39.2 |
| 2,912,137 | 11/1959 | Taylor | 220/403 |
| 2,913,029 | 11/1959 | Paton | 220/401 |
| 3,814,473 | 6/1974 | Lorenzen, Jr. . | |
| 4,279,439 | 7/1981 | Cantieri | 296/30.2 |
| 4,575,146 | 5/1986 | Markos . | |
| 4,592,583 | 6/1986 | Dresen et al. . | |
| 4,693,507 | 9/1987 | Dresen et al. . | |
| 4,746,161 | 5/1988 | Futrell . | |
| 4,789,574 | 12/1988 | Selvey | 296/39.2 X |
| 4,875,731 | 10/1989 | Ruiz . | |
| 4,923,240 | 5/1990 | Swanson | 296/100 |
| 4,986,590 | 1/1991 | Patti et al. . | |
| 5,007,670 | 4/1991 | Wise . | |
| 5,058,652 | 10/1991 | Wheatley et al. . | |
| 5,188,460 | 2/1933 | Dorse | 220/403 X |

FOREIGN PATENT DOCUMENTS 1260708 4/1961 France ........................ 296/39.2

Primary Examiner—David M. Mitchell
Assistant Examiner—Gary C. Hoge
Attorney, Agent, or Firm—Merchant, Gould, Smith Edell, Welter & Schmidt

[57] ABSTRACT

A flexible cargo container that conforms to the shape of a truck bed which allows the cargo being transported to be totaled surrounded by the flexible protective fabric. The cargo container and its contents may be removed from the truck bed simultaneously, providing greater efficiency of cargo transportation and storage.

5 Claims, 4 Drawing Sheets

FLEXIBLE CARGO CONATINER FOR TRUCK BEDS

BACKGROUND OF THE INVENTION

1. Field of the Invention

The present invention relates to a flexible cargo container for use in the cargo area of a truck bed, and more particularly, to a removable cargo container that conforms to the shape of various sizes of truck beds which may be removed from the truck simultaneously with the cargo.

2. Description of the Prior Art

The use of flexible material for truck bed covers and liners is well known in the art. An example of a flexible fabric used for a truck bed covers is set forth in U.S. Pat. No. 5,058,652. An example of the use of flexible material in a truck bed liner is set forth in U.S. Pat. No. 5,007,670 where the liner includes a pad portion.

Truck bed covers allows for the containment of cargo being transported in a truck bed and the protection of that cargo from the outside environment. However, such covers do not protect the cargo being transported from the hard and abrasive surface of a truck bed. In addition, the cover does not protect the truck bed from damage caused by movement of the cargo during transport. While truck bed liners protect the truck bed from damage caused by movement of the cargo during transport, truck bed liners do not protect the cargo from damage due to movement, or from the outside environment. Neither of these previous solutions provide for the total containment and protection of cargo being transported in the truck bed.

Cargo being transported in a truck using a conventional liner must be removed from the bed before the liner can be removed from the truck. However, there are situations when it may be desirable to remove the cargo and the truck bed liner simultaneously.

SUMMARY OF THE INVENTION

The present invention provides a cargo container which is suitable for being attached to the sidewalls of a truck bed, and removal of the cargo container and its contents simultaneously, providing greater efficiency of cargo transportation and storage.

Another important object of the present invention is to protect both the cargo within the container and the truck bed from deterioration due to rust, abrasion and other damage of the type often inflicted upon unprotected beds.

The cargo container may be constructed of two flexible fabric sheets having a seam holding the two sheets together and adjusted to conform to the shape of the truck bed. The cargo container has a bottom surface, a sidewall arrangement, container cover, zipper and plurality of fasteners for securing the container to the truck. The cargo container allows the cargo being transported to be totally surrounded by the flexible protective fabric.

The cargo container of the present invention is constructed with a minimum number of stress points to enhance the durability of the cargo container. In particular, the preferred cargo container does not have a seam around the perimeter of the bottom surface.

A container cover is attached to one sidewall and overlaps the remaining three sidewalls to provide for total encasement of the cargo. Fasteners attach the container cover to the container sidewall arrangement.

The cargo container conforms to the shape of a truck bed. The flexibility of the material making up the cargo container allows for the cargo container accommodation of truck beds having different sizes, whether or not there are wheel wells.

The cargo container may have resilient, adjustable straps attached to each corner for fastening the container to the truck bed sidewalls, creating a more stable environment for the transportation of cargo. The adjustable straps at the corners of the cargo container may act as handles for the movement of the container in and out of the truck bed.

In addition, the cargo container may be lined or coated with a material having a high co-efficient of friction that reduces sliding of cargo container contents.

The cargo container is preferably coated with a waterproofing material that repels rain and keeps the contents of the cargo container and the truck bed dry.

The cargo container structure allows for the more efficient shipment, storage and movement of cargo being transported by truck in the cargo container. The cargo container allows cargo to remain in the cargo container when the container is removed from the truck bed. The container and encased cargo may then be stacked and stored.

BRIEF DESCRIPTION OF THE DRAWINGS

These and other objects and features of the present invention will become apparent from the following description taken in conjunction with the preferred embodiments thereof with reference to the accompanying drawings in which.

DETAILED DESCRIPTION OF THE PREFERRED EMBODIMENT

Figure 1:
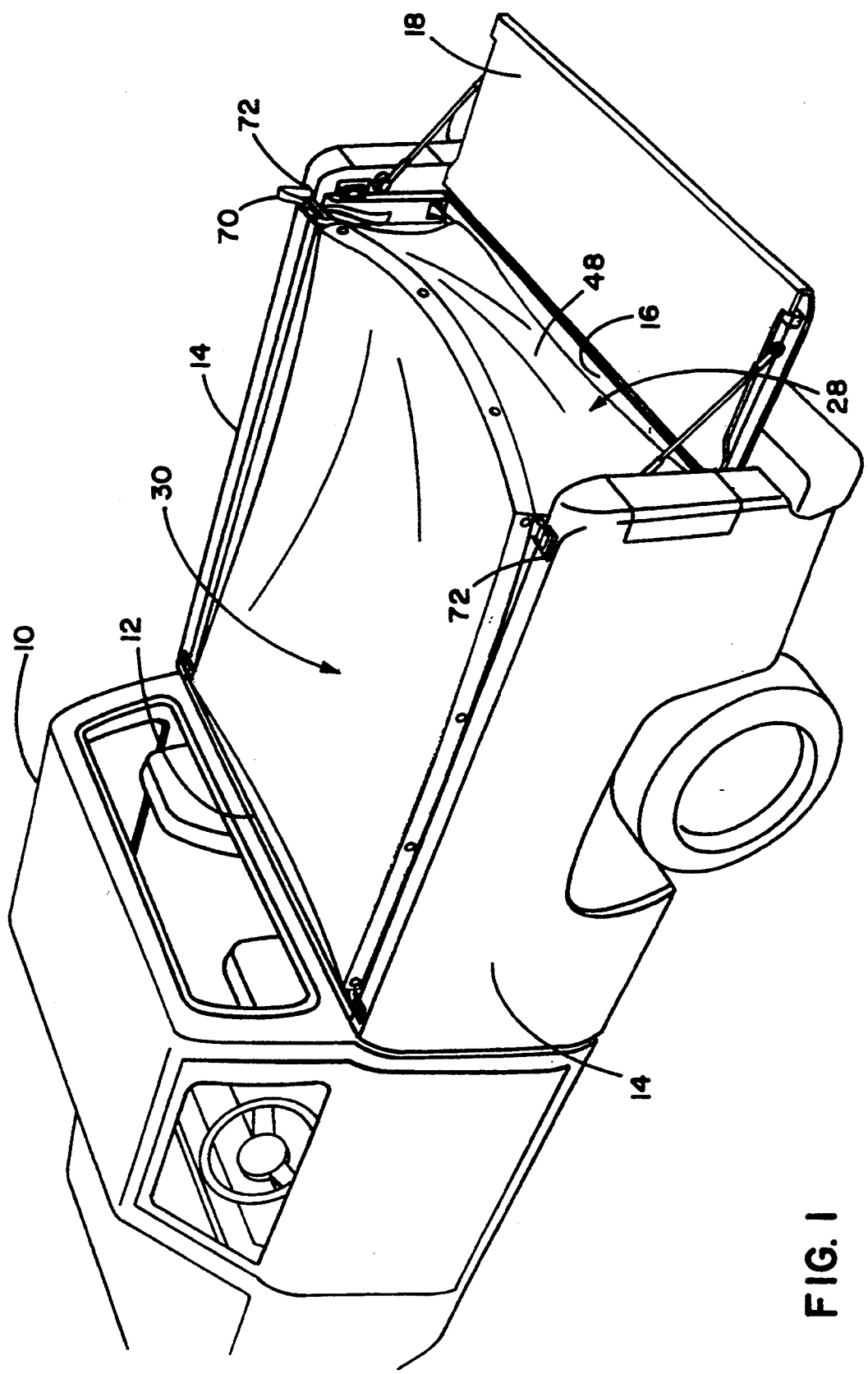
FIG. 1 illustrates a truck having the preferred cargo container attached to the truck bed by adjustable straps.
Figure 3:
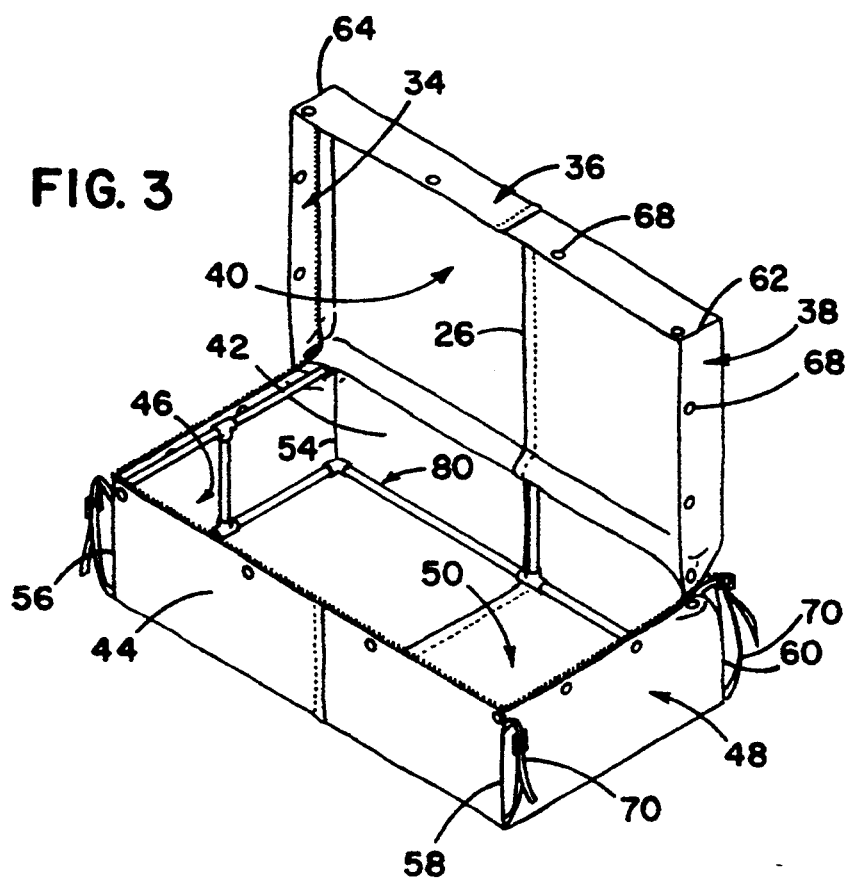
FIG. 3 illustrates the preferred cargo container with the container cover in the open position.

Referring to the Figures of the drawing which illustrate a preferred embodiment of the invention, cargo container 30 for use in the bed portion 28 of a pickup truck 10, van or the like, is illustrated in FIGS. 1 and 3. The container 30 is made of flexible material which forms a bottom surface 50 four sidewalls 42, 44, 46, 48 and a container cover 40.

Figure 2:
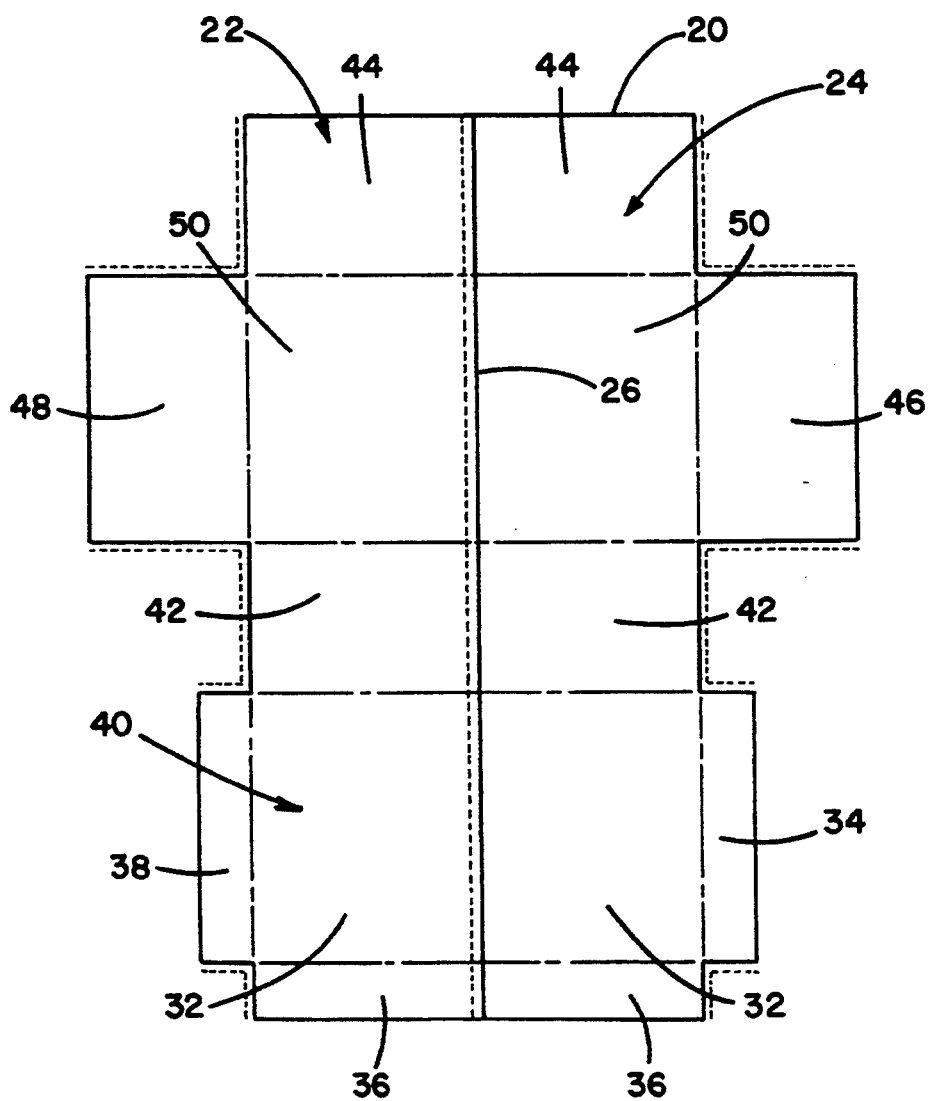
FIG. 2 illustrates the preferred attachment point of the first and second flexible fabric sheets and the preferred shape of the fabric prior to being formed into the cargo container.

As is illustrated in FIG. 2, the cargo container 30 may be constructed out of two flexible fabric sheets 22, 24 having a first seam 26 for holding the two fabric sheets 22, 24 together. After the two flexible sheets 22, 24 have been connected at the first seam 26, the flexible material 20 is adjusted in a manner that creates the cargo container 30 as shown in FIG. 3, wherein the cargo container 30 has a bottom surface 50, a sidewall arrangement including two side surfaces 42, 44, a front surface 46, a back surface 48, and a container cover 40 having a top surface 32, and container cover sidewalls 34, 36, and 38.

In the preferred embodiment as can be shown in FIG. 3, the first seam 26 connecting the two flexible fabric sheets 22, 24 is located in the center of the two side surfaces 42, 44, the bottom surface 50 and the container cover 40. The perimeter of the bottom surface 52 is formed by bending the flexible fabric sheets 20 and does not have seams. This structure enhances cargo container 30 strength and durability by eliminating stress points at the location most likely to encounter stress.

Although the cargo container 30 has eliminated stress points by not having a perimeter seam along the bottom surface 52, there are still a number of seams 54, 56, 58, 60, 62, 64 included in making the cargo container 30. Seams 54, 56, 58, and 60 are formed along the corners of cargo container 30 sidewalls 42, 44, 46, 48. Seams 62 and 64 are located at the corner edges of the cargo container cover 40 sidewall 34, 36, 38.

Figure 5:
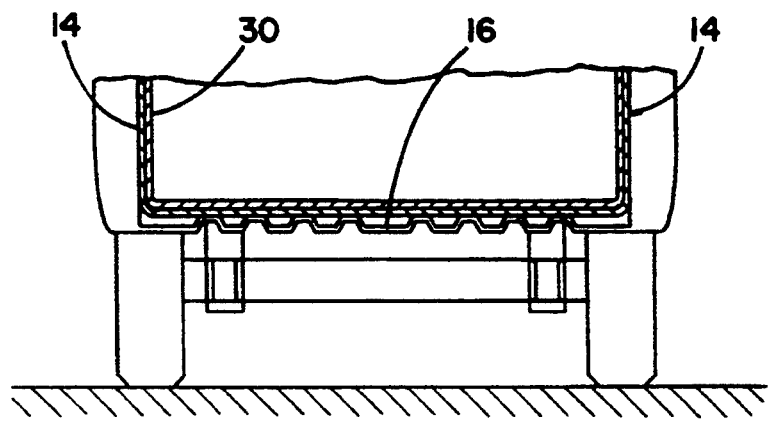
FIG. 5 illustrates the preferred cargo container conforming to the sides of the truck bed.
Figure 6:
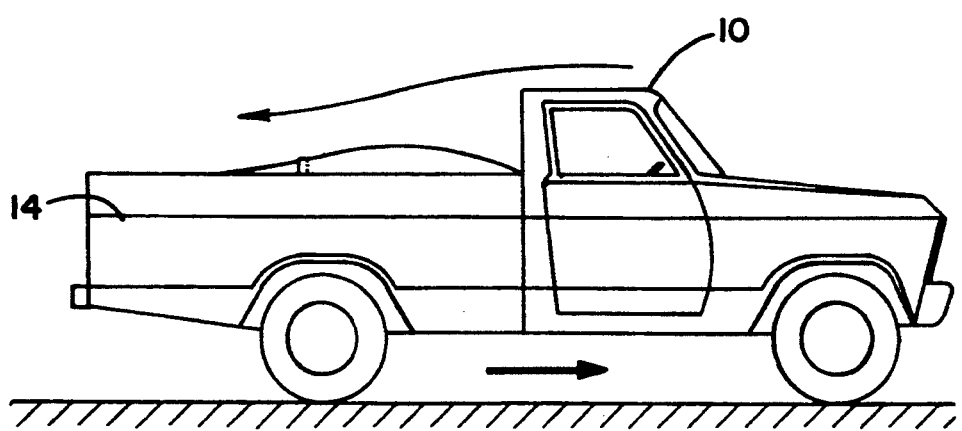
FIG. 6 illustrates the interaction of the wind with the cargo container cover caused by a truck traveling in a forward direction.

As can be seen in FIGS. 1 and 5, the flexible cargo container 30 conforms on the shape of the truck bed 28. The two side surface 42, 44 of the cargo container 30 rest against the two opposing truck bed sidewalls 14. The front surface 46 of the container 30 rests up against truck bed front wall 12. The back surface 48 rests up against a hinged gate 18, which operates as the truck bed back wall when in its closed position. The bottom surface 50 rests on the truck bed floor 16. This is an important feature of the preferred embodiment because not all truck beds 28 are the same size or shape.

The flexibility of the cargo container 30 allows the bottom surface 50 to accommodate truck beds 28 containing or lacking wheel wells. The ability of the cargo container 30 to accommodate truck beds 28 of various dimensions allows for use of one cargo container 30 on many different styles and sizes of trucks 10.

Figure 4:
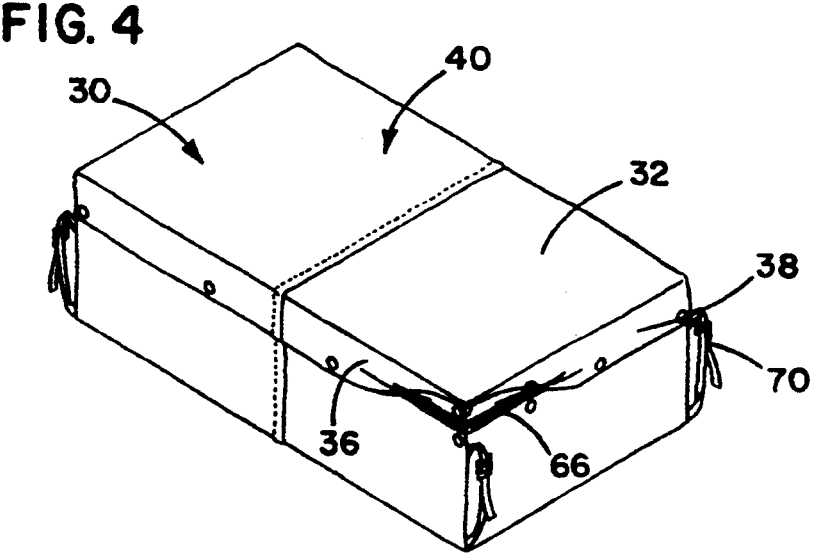
FIG. 4 illustrates the preferred cargo container with the cargo container cover overlapping the sidewalls.

The cargo container 30 has the ability to completely encase whatever cargo that are being transferred by closing of the container cover 40 as shown in FIG. 4. Because of the flexible nature of the materials 20 making up the cargo container 30, the container cover 40 has to be fastened to the cargo container sidewalls 44, 46, 48. This prevents the cargo container cover 40 from blowing open due to increased wind pressure when a truck 10 is traveling at a high rate of speed.

The container cover 40 may be fastened to the container sidewalls 44, 46, 48 by use of a zipper 66 that extends along the edge of the container sidewalls 44, 46, 48 and the edge of the container cover sidewalls 34, 36, 38 as shown in FIGS. 3 and 4. To reinforce the zipper 66, fastener snaps or buttons 68 are placed along the container sidewalls 44, 46, 48 and the container cover sidewalls 34, 36, 38 as illustrated in FIGS. 3 and 4. The male portion of the button is preferably attached to the container sidewalls 44, 46, 48 and the female portion of the button to the container cover sidewalls 34, 36, 38. The mating of the male and female button pieces is shown in FIG. 4. The buttons 68 assure that the container cover 40 will remain closed when in use.

Another important feature of the cargo container 30 is that it is attachable or removable from the truck bed 28. The cargo container 30 can be attached to the truck bed 28 by using the adjustable straps 70, preferably located at the corners 54, 56, 58, 60 of the cargo container 30, as illustrated in FIG. 1. The straps may be attached to the truck bed sidewalls 14 by threading the adjustable straps 70 through the attachment holes 72 in the truck bed sidewalls 14. The adjustable straps 70 are threaded in a manner as shown in FIG. 1, enhancing the stability of the container 30.

The ability to remove the cargo container 30 allows for more efficiency in shipment and storage of cargo. This feature allows for cargo stored to remain in the cargo container 30 when removed from the truck bed 28. This feature is important if for example the cargo being hauled would be damaged by rain. In the past, a cargo susceptible to damage by rain had to be removed from the truck 10 and stored in another waterproof container. The cargo container 30 can act as a large bag to protect the cargo once it has been removed from the truck 10. The containers 30 may also be stacked for storage.

The cargo container is preferably coated with a waterproofing material, such as vinyl, plastic, or rubber, keeping the contents of the cargo container 30 completely dry. In addition to protecting the cargo, the waterproofing of the cargo container 30 also protects the truck bed 28 from the elements. In another embodiment, the bottom 50 of the cargo container 30 may be coated with an anti-friction material to prevent the cargo from moving and being damaged during transport.

The cargo container 30 can be formed out of a number of fabric types, in accordance with the level of strength desired and the type of cargo that will be confined within the container 30.

In addition, a container skeleton 80 (see FIG. 3) may also be used to give the cargo container 30 additional structural support than that provided by the adjustable strap 70. The container 30 skeleton is formed by a plurality of shafts, and a plurality of shaft connectors. The shafts are attached to form a structure that acts as a skeleton support structure for the cargo container 30 when the adjustable straps 70 are not in use. The container skeleton is preferably located inside the container 30, although it is possible for the skeleton to be located on the outside of the container 30. The container skeleton is particularly useful when the container 30 has been removed from the truck 10.

Other modifications of the invention will be apparent to those skilled in the art in view of the foregoing descriptions. These descriptions are intended to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and broad scope of the appended claims are covered.

What is claimed:

1. A flexible cargo container for use in a truck bed, the truck bed having two opposing sidewalls, a front wall, a bottom, and a hinged gate forming a back wall, said container comprising: a flexible fabric sheet constructed and arranged to form a container having a bottom surface with a perimeter, two opposing side surfaces, a front surface, and a back surface extending generally vertically upward from the perimeter of the bottom surface to form a container with an opening, said container generally corresponding to the bottom and walls of the truck bed, and a top surface extending generally from a side surface over the container opening and configured to form a container cover, said container cover comprising: a top surface having a perimeter, and a first, second, and third sidewall extending generally downward from the perimeter of the top surface to engage with a side surface, front surface, and back surface of the container.

2. The cargo container of claim 1 wherein the flexible fabric sheet comprises a first and second flexible fabric sheets connected to a first seam so that the first seam is spaced from and parallel to said two opposing side surfaces.

3. The cargo container of claim 1 further including fastener means for fastening the container cover to the container.

4. The cargo container of claim 3 wherein the fastener means comprises a zipper.

5. The cargo container of claim 3 wherein the fastener means comprises a plurality of snaps.

* * * * *

UNITED STATES PATENT AND TRADEMARK OFFICE
CERTIFICATE OF CORRECTION

PATENT NO. :   5,378,034

DATED      :   January 3, 1995

INVENTOR(S) :  Robert J. Nelsen

It is certified that error appears in the above-identified patent and that said Letters Patent is hereby corrected as shown below:

On the patent front, in the Title, item [54], "CONATINER" should be --CONTAINER--.

In the Abstract, line 3, "totaled" should be --totally--.

Column 1, line 17, delete "a" after --for--.

Column 3, line 23, "surface" should be --surfaces--.

Signed and Sealed this

Twentieth Day of June, 1995

Attest:

BRUCE LEHMAN

Attesting Officer      Commissioner of Patents and Trademarks